United States Patent
Sutter, Jr. et al.

(10) Patent No.: US 8,246,116 B1
(45) Date of Patent: Aug. 21, 2012

(54) HEAD RESTRAINT ASSEMBLY WITH SLIDING LATCH

(76) Inventors: Robert R. Sutter, Jr., Rockford, MI (US); Elindo G. Castro, Wyoming, MI (US)

( * ) Notice: Subject to any disclaimer, the term of this patent is extended or adjusted under 35 U.S.C. 154(b) by 156 days.

(21) Appl. No.: 12/862,366

(22) Filed: Aug. 24, 2010

Related U.S. Application Data

(60) Provisional application No. 61/274,973, filed on Aug. 24, 2009.

(51) Int. Cl.
*B60N 2/48* (2006.01)

(52) U.S. Cl. ..................... 297/408

(58) Field of Classification Search ............. 297/408, 297/410
See application file for complete search history.

(56) References Cited

U.S. PATENT DOCUMENTS

| | | | |
|---|---|---|---|
| 7,306,287 B2 * | 12/2007 | Linardi et al. | 297/410 |
| 7,431,400 B2 * | 10/2008 | Brawner | 297/408 |
| 7,578,559 B2 * | 8/2009 | Yamane et al. | 297/408 |
| 7,648,200 B2 * | 1/2010 | Oda | 297/408 X |
| 7,669,932 B1 * | 3/2010 | Gronninger et al. | 297/408 |
| 7,717,517 B2 * | 5/2010 | Yamane et al. | 297/408 |
| 7,984,951 B2 * | 7/2011 | Sayama | 297/408 |
| 7,988,234 B2 * | 8/2011 | Kim et al. | 297/408 |
| 8,066,330 B2 * | 11/2011 | Keller et al. | 297/408 |
| 8,104,836 B2 * | 1/2012 | Little | 297/408 |
| 8,157,320 B2 * | 4/2012 | Sayama | 297/408 X |
| 8,172,330 B2 * | 5/2012 | Sayama | 297/408 |
| 2006/0226689 A1 * | 10/2006 | Linnenbrink et al. | 297/408 |
| 2006/0250017 A1 * | 11/2006 | Otto et al. | 297/410 |
| 2007/0001500 A1 * | 1/2007 | Kraft et al. | 297/408 |
| 2007/0132300 A1 * | 6/2007 | Toba | 297/408 |
| 2007/0152487 A1 * | 7/2007 | Brockman et al. | 297/408 |
| 2007/0164593 A1 * | 7/2007 | Brockman | 297/408 |
| 2007/0170766 A1 * | 7/2007 | Brawner | 297/408 |
| 2007/0236070 A1 * | 10/2007 | Brockman | 297/408 |
| 2007/0284929 A1 * | 12/2007 | Keller et al. | 297/408 |
| 2008/0203801 A1 * | 8/2008 | Jammalamadaka et al. | 297/408 |
| 2008/0277989 A1 * | 11/2008 | Yamane et al. | 297/408 |
| 2009/0021068 A1 * | 1/2009 | Yamane et al. | 297/408 |
| 2009/0152924 A1 * | 6/2009 | Kim et al. | 297/408 |
| 2010/0026074 A1 * | 2/2010 | Sayama | 297/408 |
| 2010/0045090 A1 * | 2/2010 | Brunner et al. | 297/408 |
| 2010/0072803 A1 * | 3/2010 | Sayama | 297/408 |
| 2010/0078972 A1 * | 4/2010 | Sayama | 297/408 X |
| 2010/0117432 A1 * | 5/2010 | Lutzka et al. | 297/408 |
| 2010/0133889 A1 * | 6/2010 | Lutzka et al. | 297/408 |
| 2010/0219670 A1 * | 9/2010 | Jammalamadaka et al. | 297/408 |
| 2010/0283305 A1 * | 11/2010 | Yetukuri et al. | 297/408 |
| 2011/0095592 A1 * | 4/2011 | Willard et al. | 297/408 |

* cited by examiner

*Primary Examiner* — Rodney B White
(74) *Attorney, Agent, or Firm* — Dickinson Wright PLLC

(57) ABSTRACT

A head restraint assembly comprising a housing, an armature extending though opposite sides of the housing, at least one latch receiving member provided on the armature and coupled thereto for non-rotatable movement with respect to the armature, and a latch member extending though opposite sides of the housing. The latch member includes a projection that engages the at least one latch receiving member when the latch member is moved into a latched position.

30 Claims, 2 Drawing Sheets

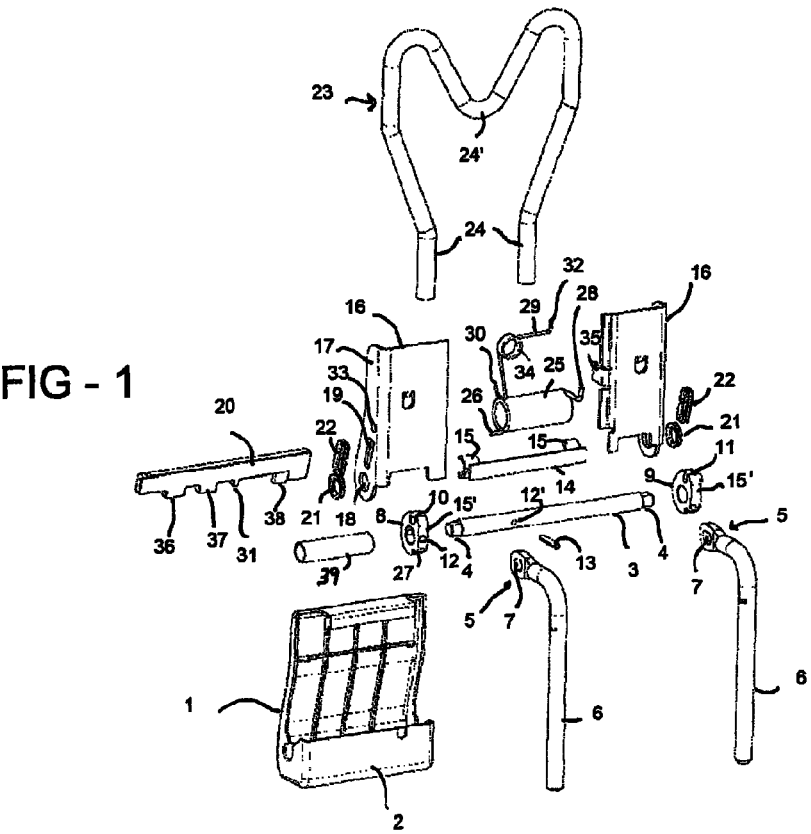
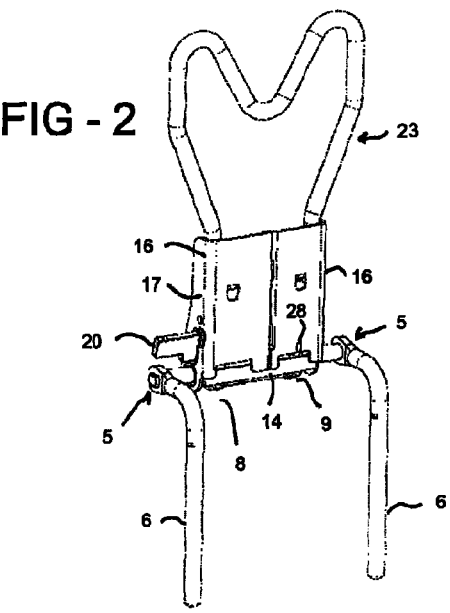
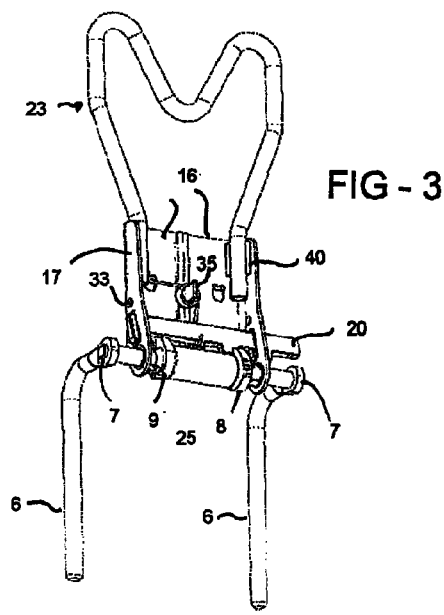

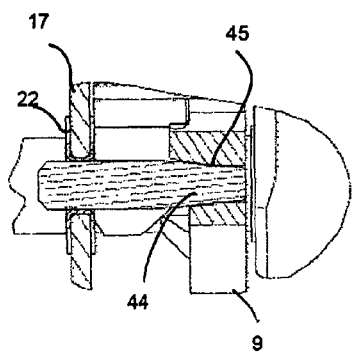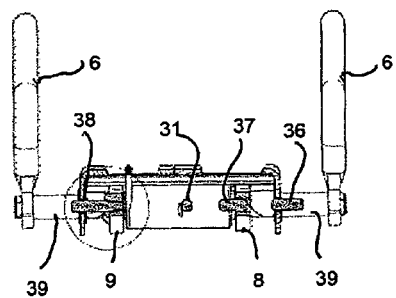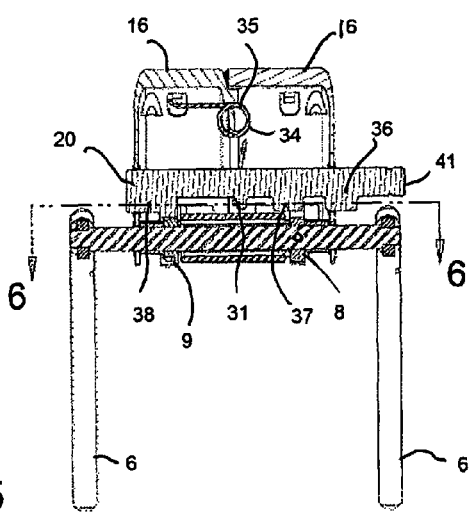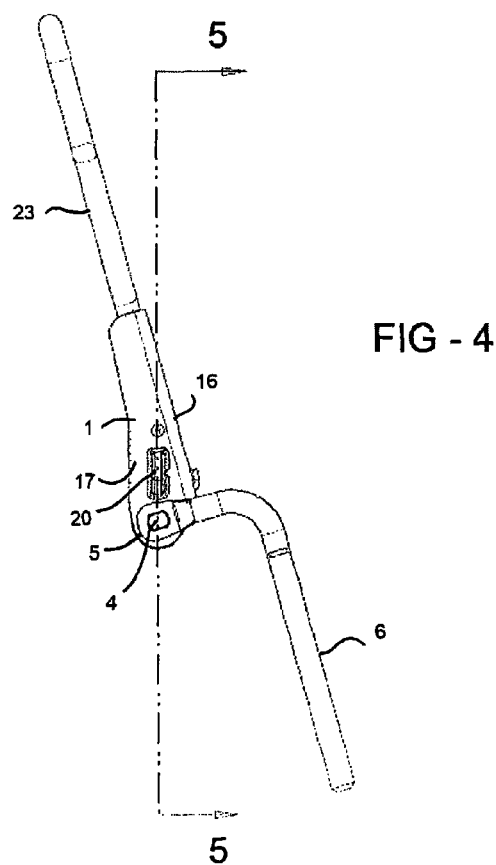

HEAD RESTRAINT ASSEMBLY WITH SLIDING LATCH

CROSS-REFERENCE TO RELATED APPLICATIONS

This application is related to, and claims the benefit of priority from, U.S. Provisional Patent Application Ser. No. 61/274,973 filed 24 Aug. 2009, the disclosure of which application is incorporated herein by reference in its entirety.

FIELD OF THE INVENTION

The present invention relates to vehicle head restraints, and more particularly to a head restraint assembly that includes a sliding latch for securing a bun or headrest into an upright position.

BACKGROUND

Head restraints protect vehicle occupants from suffering serious injury due to sudden movement of the vehicle. Head restraints typically extend upward from the top of a vehicle seat and are anchored within the seat assembly.

While head restraints are necessary in order to insure the safety of passengers, at times the head restraints can present difficulties. For example, head restraints can obstruct a driver's view when looking rearward. Also, if a seat is folded forward to allow a passenger to enter the rear portion of a vehicle, a head restraint may contact an object in front of the seat thus stopping the seat from fully folding down. In vehicles with seats that fold flat into the floor, head restraints must be removed or additional stowage space in the floor of the vehicle must be provided.

U.S. Pat. No. 6,902,232 to Kamrath discloses a foldable head restraint that pivots into a stowed position as the seatback is folded forward. The headrest pivots into a stowed position so that the seat back may lay flat when folded. When the seatback is returned to the upright position, the headrest returns to its original extended position.

While foldable head restraints offer advantages over non-foldable head restraints, foldable head restraints are generally more difficult to assemble and therefore relatively more expensive.

The present invention provides an articulating head restraint assembly having a sliding latch that is designed to have components that can be readily changed or modified to enable the assembly to be used for a variety of seat and bun or headrest styles or models.

SUMMARY OF THE DISCLOSURE

The specification discloses a head restraint assembly comprising a housing, an armature extending though opposite sides of the housing, at least one latch receiving member provided on the armature and coupled thereto for non-rotatable movement with respect to the armature, and a latch member extending though opposite sides of the housing. The latch member includes a projection that engages the at least one latch receiving member when the latch member is moved into a latched position.

Per one feature of the invention, the at least one latch receiving member includes a latch receiving notch and the latch member includes at least one engaging projection which engages the latch receiving notch when the latch member is moved into a latched position. Per another feature, the latch receiving notch and the at least one engaging projection mat be complementarily and cooperatively tapered.

Per another feature, the at least one latch receiving member comprises a plurality of latch receiving members and the at least one engaging projection comprises a plurality of engaging projections. According to one feature, the housing includes opposite side walls having through-holes through which the latch member can moved, and the plurality of engaging projections include engaging projections that engage the through-holes and prevent me latch member from rotating.

According to still another feature, the housing supports a bun substrate tube. Still further, the housing may include a main housing portion and a pair of front housing panels, with the bun substrate tube coupled to the pair of front housing panels. Still further, the main housing portion includes a lower portion having the shape of a trough or channel into which the armature is positioned.

According to yet another feature of the present invention, a pair of head restraint supports are coupled to opposite ends of the armature. Still further, the opposite ends of the armature may have non-circular shapes, and the head restraint supports may have complementarily non-circular shaped through-holes which receive the opposite ends of the armature.

Per a still further feature, the at least one latch receiving member comprises a plurality of latch receiving members of which only one is non-rotatably coupled to the armature. The head restraint assembly further includes a stabilizer bar that couples each of the plurality of latch receiving members together so that none of the plurality of latch receiving members rotate with respect to the armature. Still further, the stabilizer bar may be provided with clip structures, and the plurality of latch receiving members may be configured to allow the stabilizer bar to be coupled thereto by the clip structures.

BRIEF DESCRIPTION OF DRAWINGS

The present invention will be described with reference to the attached drawings which are given as non-limiting examples only, in which:

FIG. 1 is a front perspective exploded view of a head restraint assembly according to one embodiment of the present invention.

FIG. 2 is a front perspective view of the head restraint assembly of FIG. 1 assembled.

FIG. 3 is a front perspective view of the head restraint assembly of FIG. 2 with the main housing member 1 removed.

FIG. 4 is a side view of the head restraint assembly of FIG. 2.

FIG. 5 is a sectional view of the head restraint assembly of FIG. 4 taken along section lines 5-5.

FIG. 6 is a sectional view of the head restraint assembly of FIG. 5 taken along section lines 6-6.

FIG. 7 is an enlarged detailed view of the circled portion of FIG. 6.

DETAILED DESCRIPTION

The present invention is directed to vehicle head restraints and more particularly to head restraint assemblies that include sliding latches for securing buns or headrests into an upright position. The head restraint assemblies of the present invention include housings that are configured to contain the components and elements of the head restraint assemblies and be rotatably coupled to an armature which extends through opposite sides of the housings. The ends of the armature are non-rotatably coupled to head restraint supports that are fixed to the back of a seat in a conventional manner. The housings allow the head restraint assemblies to be modular so that elements contained therein can be interchanged with similar elements that adapt the head restraint assemblies for different types and models of seats.

The housings include a rear main housing portion that includes a lower compartment that has the shape of a trough or channel into which the armature and other components of the head restraint assemblies are received and housed. The housings further include a pair of front housing panels which support a return spring for a sliding latch member and a bun substrate tube upon which a conventional bun or headrest can be mounted in a conventional manner. The housings include a front, rear and opposite sides. The opposite sides of the housings include a first pair of through-holes through which the armatures extend and a second pair of through-holes through which a latch members can slide.

A pair of latch receiving members is mounted on the armatures, at least one of which is fixed or coupled in a non-rotatable manner to the armatures. The latch receiving members include latch receiving notches through which the sliding latch members can slide and engage or disengage the latch receiving members.

The sliding latch members are slidingly guided through the through-holes in the opposite sides of the housings and include engaging projections. When the sliding latch members are in the latched position the engaging projections engage the latch receiving notches of the latch receiving members and the opposite sides of the housings. When the sliding latch members are in the non-latched position the engaging projections do not engage the latch receiving notches of the latch receiving members.

FIG. 1 is a front perspective exploded view of a head restraint assembly according to one embodiment of the present invention. The head restraint assembly includes a main housing member 1 having a lower compartment 2 that has the shape of a trough or channel into which the armature 3 and other components of the head restraint assembly are received and housed. The armature 3 in a cylindrical shaped rod having non-circular ends 4. The non-circular ends 4 of the armature 3 are received in ends 5 of head restraint supports 6 that are mounted in the back of a seat in a conventional manner. As shown, the ends 5 of the head restraint supports 6 have through-holes 7 that are complementarity shaped to receive non-circular ends 4 of the armature 3 therein and prevent the armature 3 from rotating with respect to the head restraint supports 6. In the depicted embodiment the non-circular ends 4 have rectangular cross-sectional shapes (as do through-holes 7). In alternative embodiments, the non-circular ends 4 (and through-holes 7) can have other non-circular shapes such as, but not limited to, square, triangular, pentagonal, hexagonal, and other geometric and non-geometric non-circular shapes. In further embodiments, bores could be used in place of through-holes 7.

A pair of latch receiving members 8 and 9 is provided on the armature 3. These latch receiving members 8 and 9 have through-holes which are configured to allow the armature to pass therethrough. Each of the latch receiving members 8 and 9 have latch receiving notches 10 and 11 into which a latch member can be received as discussed below. One of the latch receiving members 9 is provided with a pin receiving through-hole 12 through which a pin 13 can pass and secure the latch receiving member 9 in a fix, non-rotatable position on the armature 3. In this regard the armature 3 includes a through-hole 12 to receive pin 13. The non-pinned latch receiving member 9 can is held in position by a stabilizer bar 14 that has clips 15 on opposite ends which allow the stabilizer bar 14 to be attached or clipped to armature 3. The stabilizer bar 14 includes a flat portion which, when the stabilizer bar 14 is attached or clipped to armature 3, abuts against flat portions 15' of the latch receiving members 8 and 9, thereby securing the latch receiving members 8 and 9 in position on the armature 3 for receiving a latch member as discussed below.

A pair of front housing panels 16 are configured and designed to be coupled together and close the front portion of the main housing member 1. The front housing panels 16 have side walls 17 that include circular though-holes 18 through which the opposite ends of the armature 3 can extend and elongated through-hole 19 through which latch member 20 can slide. As shown, mere are friction-reducing bushings 21 and 22 that can be positioned in through-holes 18 and 19.

A bun substrate tube 23 is provided which has lower ends 24 that are configured to be coupled to each of the front housing panels 16 (See FIG. 3). The lower ends 24 of the bun substrate tube 23 can be coupled to the front housing panels 16 by mechanical structures such as clips formed on the front housing panels 16 and/or by any other suitable manner, including welding, using glues, threaded fasteners, etc.

The bun substrate tube 23 has an upper portion 24' that is configured to support a bun or headrest. The upper portion 24' of the bun substrate tube 23 can have the configuration depicted in the figures or any desired configuration that is compatible with a desired bun or headrest to be supported by the bun substrate tube 23.

A coil spring 25 is provided which positioned over the central portion of the armature 3. On end of the coil spring 25, identified by reference numeral 26 engages a notch 27 provided in the bottom of one of the latch receiving members 8 and 9. The other end 28 of the coil spring 25 engages a lower portion of one of the front housing panels 16. Coil spring 25 urges the bun substrate tub 23 into its upright position as shown in the figures.

As discussed above, latch member 20 extends through elongated through-holes 19 in the sides of the front housing panels 16 and slides therein between a latched and an unlatched position, as described in more detail below. The latch member 20 is urged into the latched position by a spring element 29. In this regard, one end 30 of spring element 29 engages a catch 31 provided on latch member 20 and the other end 32 of spring element 29 engages a catch 33 provided on one of the front housing panels 16. As depicted, spring element 29 includes a central coil 34 which is positioned over a support 35 that extends inward from one of the front housing panels 16.

In addition to catch 31, the latch member 20 includes three engaging projections 36, 37 and 38 which will be discussed in more detail below.

A pair of cylindrical spacers 39 (one shown) are provided which center the head restraint assembly between the head restraint supports 6.

FIG. 2 is a front perspective view of the head restraint assembly of FIG. 1 assembled. In FIG. 2 the latch member 20 is in the latched position in which the bun substrate tube 32 cannot be rotated or pivoted about or with respect to armature 3. In this position a portion of latch engaging projection 36 extends into elongated through-hole 19 as shown. In FIG. 2 the end 28 of coil spring 25 can be seen as it engages the front housing panel 16.

FIG. 3 is a front perspective view of the head restraint assembly of FIG. 2 with the main housing member 1 removed. FIG. 3 depicts an embodiment in which the lower ends 24 of the bun substrate tube 23 can be coupled to the front housing panels 16 by mechanical engaging structures 40, which function as clips. FIG. 3 also depicts how the central coil 34 of spring element 29 is positioned over support 35 that extends inward from one of the front housing panels 16 and how the end 30 of spring element 29 engages a catch 31 provided on latch member 20 and the other end 32 of spring element 29 engages a catch 33 provided on one of the front housing panels 16. The spring element 29 urges the latch member 20 to the right in FIG. 3.

FIG. 4 is a side view of the head restraint assembly of FIG. 2. FIG. 5 is a sectional view of the head restraint assembly of FIG. 4 taken along section lines 5-5. FIG. 6 is a sectional view of the head restraint assembly of FIG. 5 taken along section lines 6-6. FIG. 7 is an enlarged detailed view of the circled portion of FIG. 6.

As shown in FIGS. 5 and 6, when the latch member 20 is in the latched position engaging projection 36 of the latch member 20 engages the side of one of the front housing panels 16 and engaging projection 37 engages latch receiving notch 10 of latch receiving member 8, and engaging projection 38 engages both the side of the other front housing panel 16 and the latch receiving notch 11 of latch receiving member 9.

As can be understood from FIGS. 5 and 6, when the latch member 20 is pushed against the force of spring element 29 (by pushing on end 41 of latch member 20), engaging projections 37 and 38 of the latch member 20 move out of engagement with the latch receiving notches 10 and 11 of latch receiving members 8 and 9, thereby allowing the bun substrate tube 32 (and main housing member 1, front housing panels and elements contained therein) to be rotated or pivoted about or with respect to armature 3.

As shown in FIG. 7, engaging projection 38 on latch member 20 includes a tapered portion 44 which is received in a complimentarily tapered portion 45 of latch receiving notch 11 in latch receiving member 9. This tapered coupling of the engaging projection 38 of the latch member 20 and the latch receiving notch_provides a wedging action that eliminates free play, and subsequent buzz, squeak and rattle within the assembly.

Elements of the head restraint assembly described herein can be made from suitably strong and durable materials including metals and/or plastic materials. The armature 3, latch receiving members 8 and 9, and latch member 20 are preferably made from metal. The latch member 20 should have a smooth surface to enable it to slide freely within the elongated through-holes 19 of the side portions of the front housing panels (and within bushings 22) and within the latch receiving notches 10 and 11 of the latch receiving members 8 and 9. In one embodiment, the latch member can be made by a powdered metal process or a fine blanking process to ensure that a smooth surface is developed. Otherwise the latch member 20 or surfaces thereof could be polished.

As can be seen from the above description and the drawings, the elements of the head restraint assembly allow for the assembly of either right-hand operated or left-hand operated latching. That is, the latch member 20 and armature 3 with latch receiving members 8 and 9 can merely be turned around to provide either right-hand operated or left-hand operated latching. It is also possible to modify the head restraint assembly to provide for different angles at which the bun substrate tube extends by changing the location of the latch receiving notches 10 and 11 on the latch receiving member 8 and 9. Thus the overall head restraint assembly can be easily and readily modified for various seat and bun or headrest designs.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above or as set forth in the attached claims.

The invention claimed is:

1. A head restraint assembly which comprises:
a housing;
an armature which extends through opposite sides of the housing;
at least one latch receiving member provided on the armature and coupled thereto for non-rotatable movement with respect to the armature; and
a latch member which extends through opposite lateral sides of the housing for reciprocal sliding movement between latched and unlatched positions, the latch member including at least one integral projection that engages the at least one latch receiving member when the latch member is moved into the latched position.

2. A head restraint assembly according to claim 1, wherein the at least one latch receiving member includes a latch receiving notch and the latch member includes at least one engaging projection which engages the latch receiving notch when the latch member is moved into a latched position.

3. A head restraint assembly according to claim 2, wherein the latch receiving notch and the at least one engaging projection are complimentary and cooperatively tapered.

4. A head restraint assembly according to claim 2, wherein the at least one latch receiving member comprises a plurality of latch receiving members and the at least one engaging projection comprises a plurality of engaging projections.

5. A head restraint assembly according to claim 4, wherein the housing includes opposite side walls having through-holes through which the latch member can be moved and the plurality of engaging projections includes engaging projections that engage the through holes and prevent the latch member from rotating.

6. A head restraint assembly according to claim 1, wherein the housing supports a bun substrate tube.

7. A head restraint assembly according to claim 6, wherein the housing includes a main housing portion and a pair of front housing panels and the bun substrate tube is coupled to the pair of front housing panels.

8. A head restraint assembly according to claim 7, wherein the main housing portion includes a lower portion having the shape of a trough or channel into which the armature is positioned.

9. A head restraint assembly according to claim 1, wherein a pair of head restraint supports is coupled to opposite ends of the armature.

10. A head restraint assembly according to claim 9, wherein the opposite ends of the armature have non-circular shapes and the head restraint supports have complimentarily non-circular shaped through-holds which receive the opposite ends of the armature.

11. A head restraint assembly according to claim 1, wherein the at least one latch receiving member comprises a plurality of latch receiving members of which only one is non-rotatably coupled to the armature and the head restraint assembly further includes a stabilizer bar that couples each of the plurality of latch receiving members together so that none of the plurality of latch receiving members rotate with respect to the armature.

12. A head restraint assembly according to claim 11, wherein the stabilizer bar is provided with clip structures and the plurality of latch receiving members are configured to allow the stabilizer bar to be coupled thereto by the clip structures.

13. In a head restraint having a non-rotatable armature and a bun or headrest support configured to rotate with respect to the armature, the improvement comprising a latch assembly that comprises:
a housing;
at least one latch receiving member provided on the armature and coupled thereto for non-rotatable movement with respect to the armature; and
a latch member which extends through opposite lateral sides of the housing for reciprocal sliding movement between latched and unlatched positions, the latch member including at least one integral projection that engages the at least one latch receiving member when the latch member is moved into the latched position.

14. A head restraint assembly according to claim 13, wherein the at least one latch receiving member includes a latch receiving notch and the latch member includes at least one engaging projection which engages the latch receiving notch when the latch member is moved into a latched position.

15. A head restraint assembly according to claim 14, wherein the latch receiving notch and the at least one engaging projection are complimentarily and cooperatively tapered.

16. A head restraint assembly according to claim 14, wherein the at least one latch receiving member comprises a plurality of latch receiving members and the at least one engaging projection comprises a plurality of engaging projections.

17. A head restraint assembly according to claim 16, wherein the housing includes opposite side walls having through-holes through which the latch member can be moved and the plurality of engaging projections that engage the through-holes and prevent the latch member from rotating.

18. A head restraint assembly according to claim 16, wherein housing includes opposite side walls having through-holes through which the latch member can moved and the plurality of engaging projections includes engaging projections that engage the through-holes and prevent the latch member from rotating.

19. A head restraint assembly according to claim 13, wherein the at least one latch receiving member comprises a plurality of latch receiving members of which only one is non-rotatably coupled to the armature and the head restraint assembly further includes a stabilizer bar that couples each of the plurality of latch receiving members together so that none of the plurality of latch receiving members rotate with respect to the armature.

20. A head restraint assembly according to claim 19, wherein the stabilizer bar is provided with clip structures and the plurality of latch receiving members are configured to allow the stabilizer bar to be coupled thereto by the clip structures.

21. A head restraint assembly which comprises:
a housing;
an armature which extends through opposite sides of the housing;
at least one latch receiving member provided on the armature and coupled thereto for non-rotatable movement with respect to the armature;
a latch member which extends through opposite sides of the housing, the latch member including a projection that engages the at least one latch receiving member when the latch member is moved into a latched position;
wherein the at least one latch receiving member includes a latch receiving notch and the latch member includes at least one engaging projection which engages the latch receiving notch when the latch member is moved into a latched position; and
wherein the at least one latch receiving member comprises a plurality of latch receiving members and the at least one engaging projection comprises a plurality of engaging projections.

22. A head restraint assembly according to claim 21, wherein at least one latch receiving member comprises a plurality of latch receiving members and the at least one engaging projection comprises a plurality of engaging projections.

23. A head restraint assembly which comprises:
a housing;
an armature which extends through opposite sides of the housing;
at least one latch receiving member provided on the armature and coupled thereto for non-rotatable movement with respect to the armature;
a latch member which extends through opposite sides of the housing, the latch member including a projection that engages the at least one latch receiving member when the latch member is moved into a latched position;
wherein the housing supports a bun substrate tube; and
wherein the housing includes a main housing portion and a pair of front housing panels and the bun substrate tube is coupled to the pair of front housing panels.

24. A head restraint assembly according to claim 23, wherein the main housing portion includes a lower portion having the shape of a trough or channel into which the armature is positioned.

25. A head restraint assembly which comprises:
a housing;
an armature which extends through opposite sides of the housing;
at least one latch receiving member provided on the armature and coupled thereto for non-rotatable movement with respect to the armature;
a latch member which extends through opposite sides of the housing, the latch member including a projection that engages the at least one latch receiving member when the latch member is moved into a latched position;
wherein a pair of head restraint supports is coupled to opposite ends of the armature; and
wherein the opposite ends of the armature have non-circular shapes and the head restraint supports have complementarily non-circular shaped through-holes which receive the opposite ends of the armature.

26. A head restraint assembly which comprises:
a housing;
an armature which extends through opposite sides of the housing;
at least one latch receiving member provided on the armature and coupled thereto for non-rotatable movement with respect to the armature;
a latch member which extends through opposite sides of the housing, the latch member including a projection that engages the at least one latch receiving member when the latch member is moved into a latched position; and
wherein the at least one latch receiving member comprises a plurality of latch receiving members of which only one is non-rotatably coupled to the armature and the head restraint assembly further includes a stabilizer bar that couples each of the plurality of latch receiving members together so that none of the plurality of latch receiving members rotate with respect to the armature.

27. A head restraint assembly according to claim 26, wherein the at least one latch receiving member comprises a plurality of latch receiving members of which only one is non-rotatably coupled to the armature and the head restraint assembly further includes a stabilizer bar that couples each of the plurality of latch receiving members together so that none of the plurality of latch receiving members rotate with respect to the armature.

28. In a head restraint having a non-rotatable armature and a bun or headrest support configured to rotate with respect to the armature, the improvement comprising a latch assembly that comprises:
- a housing;
- at least one latch receiving member provided on the armature and coupled thereto for non-rotatable movement with respect to the armature;
- a latch member which extends through opposite sides of the housing, the latch member including a projection that engages the at least one latch receiving member when the latch member is moved into a latched position;
- wherein the at least one latch receiving member includes a latch receiving notch and the latch member includes at least one latch engaging projection which engages the latch receiving notch when the latch member is moved into a latched position; and
- wherein the at least one latch receiving member comprises a plurality of latch receiving members and the at least one engaging projection comprises a plurality of engaging projections.

29. In a head restraint having a non-rotatable armature and a bun or headrest support configured to rotate with respect to the armature, the improvement comprising a latch assembly that comprises:
- a housing;
- at least one latch receiving member provided on the armature and coupled thereto for non-rotatable movement with respect to the armature;
- a latch member which extends through opposite sides of the housing, the latch member including a projection that engages the at least one latch receiving member when the latch member is moved into a latched position; and
- wherein the at least one latch receiving member comprises a plurality of latch receiving members of which only one is non-rotatably coupled to the armature and the head restraint assembly further includes a stabilizer bar that couples each of the plurality of latch receiving members together so that none of the plurality of latch receiving members rotate with respect to the armature.

30. A head restraint assembly according to claim 29, wherein the stabilizer bar is provided with clip structures and the plurality of latch receiving members are configured to allow the stabilizer bar to be coupled thereto by the clip structures.

* * * * *